US007627466B2

United States Patent
Ramsey et al.

(10) Patent No.: US 7,627,466 B2
(45) Date of Patent: Dec. 1, 2009

(54) NATURAL LANGUAGE INTERFACE FOR DRIVING ADAPTIVE SCENARIOS

(75) Inventors: William Ramsey, Redmond, WA (US); Sanjeev Katariya, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 837 days.

(21) Appl. No.: 11/277,674

(22) Filed: Mar. 28, 2006

(65) Prior Publication Data
US 2007/0106497 A1 May 10, 2007

Related U.S. Application Data

(63) Continuation-in-part of application No. 11/290,076, filed on Nov. 30, 2005, and a continuation-in-part of application No. 11/270,393, filed on Nov. 9, 2005.

(51) Int. Cl.
*G06F 17/27* (2006.01)
(52) U.S. Cl. .................. 704/9; 704/257; 704/7
(58) Field of Classification Search .............. 704/9, 704/257, 270, 1, 3, 4, 7, 10, 251, 252
See application file for complete search history.

(56) References Cited

U.S. PATENT DOCUMENTS 6,314,398 B1 * 11/2001 Junqua et al. ............... 704/257
6,643,620 B1 * 11/2003 Contolini et al. ............ 704/270

* cited by examiner

*Primary Examiner*—Huyen X. Vo
(74) *Attorney, Agent, or Firm*—Lyon & Harr, LLP; Mark A. Watson

(57) ABSTRACT

A "Natural Language Script Interface" (NLSI), provides an interface and query system for automatically interpreting natural language inputs to select, execute, and/or otherwise present one or more scripts or other code to the user for further user interaction. In other words, the NLSI manages a pool of scripts or code, available from one or more local and/or remote sources, as a function of the user's natural language inputs. The NLSI operates either as a standalone application, or as a component integrated into existing applications. Natural language inputs may be received from a variety of sources, and include, for example, computer-based text or voice input, handwriting or text recognition, or any other human or machine-readable input from one or more local or remote sources. In various embodiments, machine learning techniques are used to improve script selection and processing as a function of observed user interaction with selected scripts.

20 Claims, 11 Drawing Sheets

NATURAL LANGUAGE INTERFACE FOR DRIVING ADAPTIVE SCENARIOS

CROSS REFERENCE TO RELATED APPLICATIONS

This application is a Continuation-in-Part Application of co-pending U.S. patent application Ser. No. 11/270,393 filed on Nov. 9, 2005, and entitled "ADAPTIVE TASK FRAMEWORK," and claims priority to that application under Title 35, United States Code, Section 120. In addition, the entire subject matter of co-pending U.S. patent application Ser. No. 11/270,393 is incorporated herein by this reference.

This application is also a Continuation-in-Part Application of co-pending U.S. patent application Ser. No. 11/290,076 filed on Nov. 30 2005, and entitled "ADAPTIVE SEMANTIC REASONING ENGINE," and claims priority to that Application under Title 35, United States Code, Section 120. In addition, the entire subject matter of co-pending U.S. patent application Ser. No. 11/290,076 is incorporated herein by this reference.

BACKGROUND

1. Technical Field

The invention is related to natural language interfaces, and in particular, to a framework which facilitates modeling of advanced semantic constructs for driving scripts, such as Active Content Wizards (ACWs), to perform various functions on client machines as a function of a natural language input.

2. Related Art

Human languages are rich and complicated, including huge vocabularies with complex grammar and contextual meaning. Machine interpretation of written and/or spoken human language, even in a very limited way, is an extremely complex task and continues to be the subject of extensive research. In contrast, machine or software applications or languages generally require data to be input following very specific formats or rules. In other words, machine languages tend to be quite rigid in comparison to human languages.

Consequently, because machine interpretation of human language is so complex, while machine language itself is typically so rigid, the result or action produced by such interpretation often fails to accurately map or correspond to the user's intent. As a result, humans desiring to interact with a machine or software application via a natural language interface are often unable to effectively communicate their intent due to the rigid rules and/or an unfamiliarity or lack of knowledge of such rules.

Providing users the ability to communicate effectively to an automated system without the need to learn a machine specific language or grammar increases system usability. In fact, natural language input can be useful for a wide variety of applications, including virtually every software application with which humans are intended to interact. Typically, during natural language processing the natural language input is separated into tokens which are then mapped to one or more actions provided by the software application. Each application can have a unique set of actions.

While such uses are beneficial to the user, it can be time-consuming, repetitive, and very difficult, for software developers to draft code to properly interpret natural language input and then correctly map that input to the appropriate action for each application. Further, another problem with conventional schemes for machine-based interpretation of natural language is that there is no standardized framework for adding natural language interfaces to software applications. Further, such schemes are typically unable to learn or adapt as a function of user input and actions. Finally, such schemes are not typically capable of assisting users in developing new or task-specific natural language interfaces.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A "Natural Language Script Interface" (NLSI), as described herein, provides a natural language interface and query system for automatically interpreting natural language inputs to select, initiate, and/or otherwise present one or more scripts or other software code to the user. The NLSI provides a framework that facilitates modeling of advanced semantic constructs for allowing the user to directly locate, execute, or otherwise interact with various scripts or software code, such as an Active Content Wizard (ACW), by using natural language queries as an input mechanism.

Note that the term "natural language input," as described herein, is intended to include spoken natural language and textual natural language (both typed and handwritten) as inputs to the NLSI. The concepts underlying conversion of speech (via conventional voice recognition techniques) and handwriting (via conventional text recognition techniques) are well understood to those skilled in the art and will not be described in detail herein.

In general, the NLSI provides a system and method for managing a pool of available scripts or code, available from one or more local and/or remote databases or sets of scripts, as a function of a Task Reasoning System (TRS) which operates to map natural language inputs to one or more ACWs. In various embodiments, the NLSI operates either as a standalone application running as a process within the overall operating system, or as component that is integrated into existing applications for control of scripts either internal or external to such applications.

In particular, as noted above, the NLSI manages both the ACWs and TRS. To enable this management, the NLSI first queries each available ACW to identify a "Task Interface" and any Metadata, if present or required, to seed TRS models with initial mapping criteria. In general, the initial mapping criteria are used for mapping various natural language inputs to particular ACWs. Once this initial query/seeding operation has been completed, it is only necessary to repeat the operation for any new ACWs that are added to the pool of available scripts. However, in further embodiments, various learning techniques are used to update or otherwise improve the initial mapping criteria as a function of user interaction with various ACWs or with the NLSI.

Once the mapping of natural language inputs to one or more ACWs via the TRS has been accomplished, the NLSI operates by receiving a query, in the form of a natural language input, either from a calling application or as direct input in the case where the NLSI acts as a standalone application. This query is then passed to the TRS, which identifies the most appropriate ACW(s). Furthermore, in the case where the query includes information that can be used to fill in or complete various slots or variables within any identified ACWs, that information is automatically extracted from the query and used to populate the appropriate portions of the corresponding ACWs.

The TRS then passes the identified ACWs back to the NLSI, which then either executes one or more of the ACWs, as appropriate, and/or presents one or more of the identified ACWs to the user for further user selection or input, as applicable.

Finally, in one embodiment, feedback data, either automatic, or provided via a direct user input to the NLSI, is passed back to the TRS for use in updating the natural language mapping criteria corresponding to particular ACWs.

In view of the above summary, it is clear that in various embodiments, the NLSI described herein provides a unique system and method for providing a natural language interface to scripts such as Active Content Wizards, and the like. Other advantages of the NLSI will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION

Figure 1:
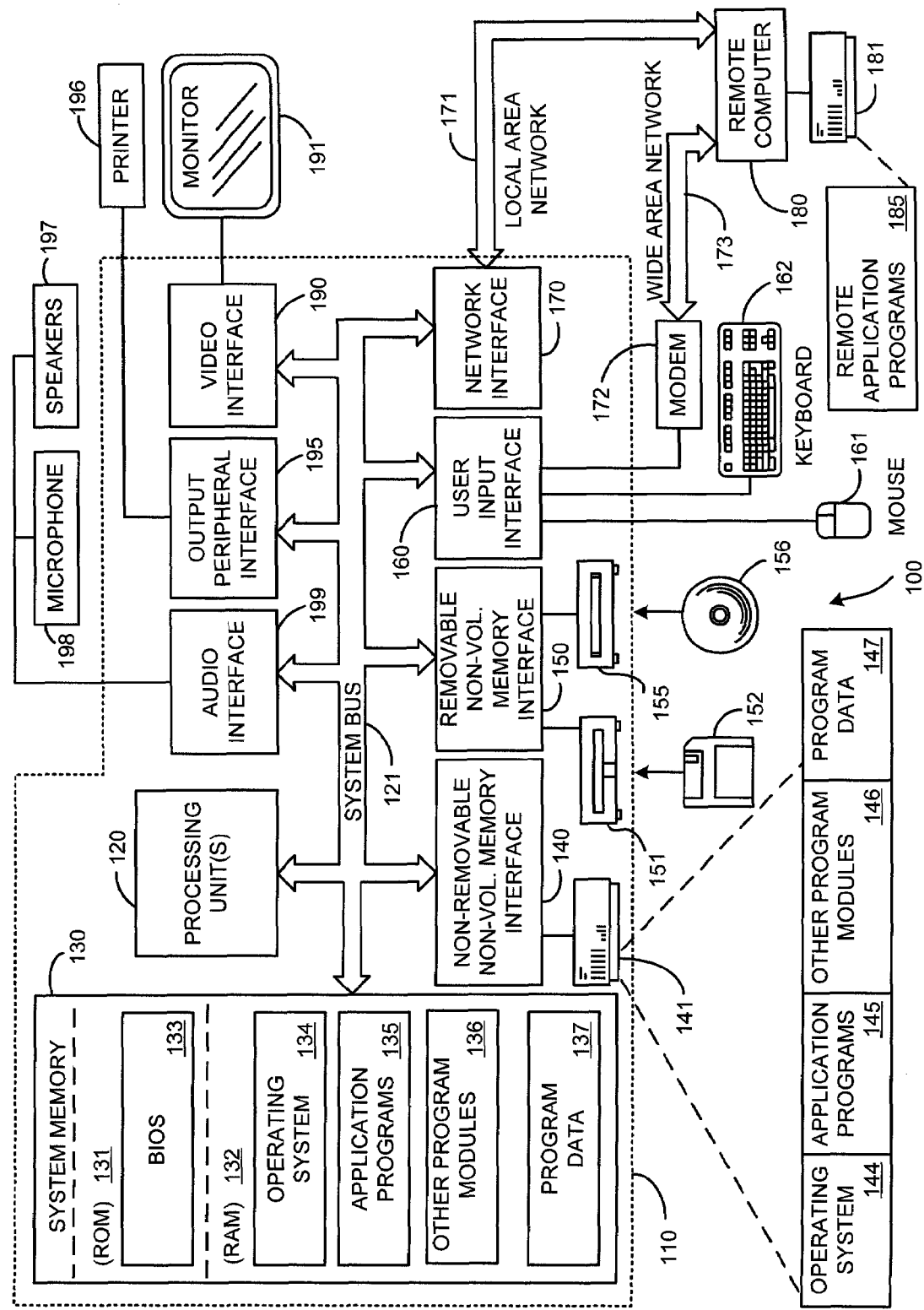
FIG. 1 is a general system diagram depicting a general-purpose computing device for use in implementing various embodiments of a "Natural Language Script Interface," as described herein.

In the following detailed description, reference is made to the accompanying drawings, which form a part hereof, and in which is shown by way of illustration specific embodiments in which the invention may be practiced. It is understood that other embodiments may be utilized and structural changes may be made without departing from the scope of the present invention.

1.0 General Definitions and Considerations:

Scripts or other code, such as "Active Content Wizards" (ACWs), are predefined sets of instructions that can perform almost any task that could be performed manually, such as, for example, changing the desktop background image, changing the internet home page, or configuring a network, to name only a few such examples. In general, such scripts have the ability to perform virtually any function on a client machine, and do not necessarily require user intervention or interaction once the script has been activated.

Scripts are generally written in extended markup language (XML) or other scripting or coding languages. However, while various examples of such scripts, as provided herein, utilize the C# and XML programming languages, any conventional programming or scripting languages may be used, as desired.

For purposes of explanation, the term ACW (Active Content Wizard) will generally be used to refer to scripts, tasks, or other software code throughout this document. However, it should be appreciated that the discussion provided herein is intended to refer to scripts or code of any type, and not merely scripts formatted as "Active Content Wizards."

In addition, the term "natural language input," as described herein, is intended to include spoken natural language and textual natural language (both typed and handwritten) as inputs to the NLSI. The concepts underlying conversion of speech (via conventional voice recognition techniques) and handwriting (via conventional text recognition techniques) are well understood to those skilled in the art and will not be described in detail herein.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on computer and the computer can be a component. One or more components may reside within a process and/or thread of execution and a component may be localized on one computer and/or distributed between two or more computers.

In addition, the disclosed subject matter may be implemented as a system, method, apparatus or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier or media.

2.0 Exemplary Operating Environments:

While the subject matter described herein is generally discussed in the context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, main-frame computers, as well as personal computers, hand-held computing devices (e.g., personal digital assistant (PDA), phone, watch, etc.), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

FIG. 1 through FIG. 4 illustrate various examples of suitable computing environments on which various embodiments and elements of a "Natural Language Script Interface" (NLSI), as described herein, may be implemented.

For example, FIG. 1 illustrates an example of a general computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The NLSI is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices. Particular "worker nodes," as described in further detail below, may also include devices having at least some minimum computational capability in combination with a communications interface, including, for example, home appliances, security systems, lighting, sensor networks, medical electronic devices, wearable computers, robotics, industrial controls, wired or wireless communication systems, audio nets, distributed computers, toys, games, etc.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, processing unit(s) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

In addition, the computer 110 may also include a speech input device, such as a microphone 198 or a microphone array, as well as a loudspeaker 197 or other sound output device connected via an audio interface 199. Other input devices (not shown) may include a joystick, game pad, satellite dish, scanner, radio receiver, and a television or broadcast video receiver, or the like. These and other input devices are often connected to the processing unit 120 through a user input interface 160 that is coupled to the system bus 121, but may be connected by other interface and bus structures, such as, for example, a parallel port, game port, or a universal serial bus (USB). A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
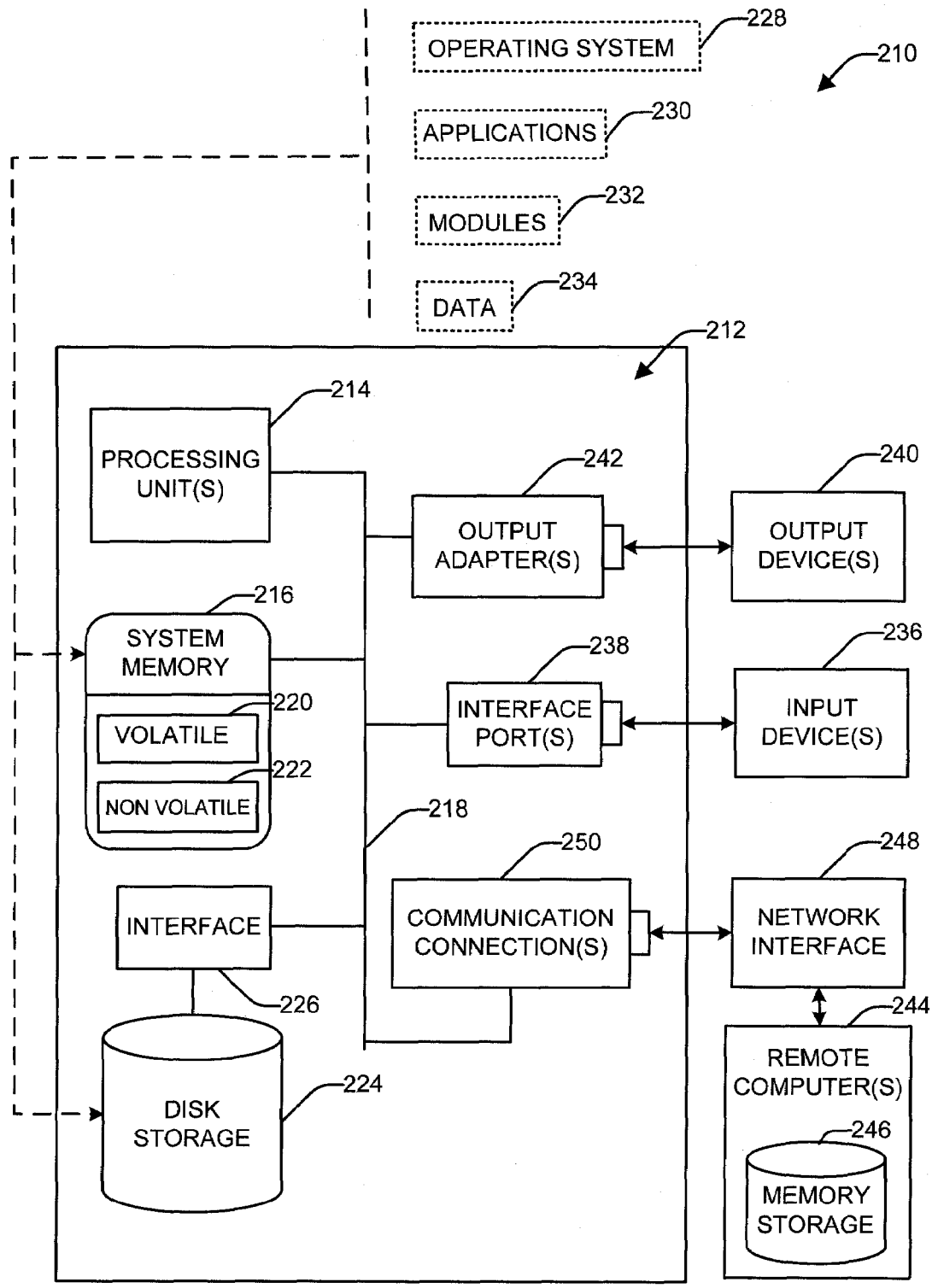
FIG. 2 is a general system diagram depicting a general-purpose computing device for use in implementing various embodiments of the Natural Language Script Interface.

FIG. 2 provides an example of another computing environment upon which various aspects of the NLSI described herein may be implemented. In particular, as illustrated by FIG. 2, an exemplary environment 210 for implementing various aspects disclosed herein includes a computer 212 (e.g., desktop, laptop, server, hand held, programmable consumer or industrial electronics, etc.). The computer 212 includes a processing unit 214, a system memory 216, and a system bus 218. The system bus 218 couples system components including, but not limited to, the system memory 216 to the processing unit 214. The processing unit 214 can be any of various available microprocessors. Dual microprocessors and other multiprocessor architectures also can be employed as the processing unit 214.

The system bus 218 can be any of several types of bus structure(s) including the memory bus or memory controller, a peripheral bus or external bus, and/or a local bus using any variety of available bus architectures including, but not limited to, 2-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 216 includes volatile memory 220 and nonvolatile memory 222. The basic input/output system (BIOS), containing the basic routines to transfer information between elements within the computer 212, such as during start-up, is stored in nonvolatile memory 222. By way of illustration, and not limitation, nonvolatile memory 222 can include read only memory (ROM), programmable ROM (PROM), electrically programmable ROM (EPROM), electrically erasable ROM (EEPROM), or flash memory. Volatile memory 220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 212 also includes removable/non-removable, volatile/non-volatile computer storage media. FIG. 2 illustrates, for example, disk storage 224. Disk storage 224 includes, but is not limited to, devices like a magnetic disk drive, floppy disk drive, tape drive, Jaz drive, Zip drive, LS-100 drive, flash memory card, or memory stick. In addition, disk storage 224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 224 to the system bus 218, a removable or non-removable interface is typically used such as interface 226.

It is to be appreciated that FIG. 2 describes software that acts as an intermediary between users and the basic computer resources described in suitable operating environment 210. Such software includes an operating system 228. Operating system 228, which can be stored on disk storage 224, acts to control and allocate resources of the computer system 212. System applications 230 take advantage of the management of resources by operating system 228 through program modules 232 and program data 234 stored either in system memory 216 or on disk storage 224. It is to be appreciated that the present invention can be implemented with various operating systems or combinations of operating systems.

A user enters commands or information into the computer 212 through input device(s) 236. Input devices 236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 214 through the system bus 218 via interface port(s) 238. Interface port(s) 238 include, for example, a serial port, a parallel port, a game port, and a universal serial bus (USB). Output device(s) 240 use some of the same type of ports as input device(s) 236.

Thus, for example, a USB port may be used to provide input to computer 212 and to output information from computer 212 to an output device 240. Output adapter 242 is provided to illustrate that there are some output devices 240 like displays (e.g., flat panel and CRT), speakers, and printers, among other output devices 240 that require special adapters. The output adapters 242 include, by way of illustration and not limitation, video and sound cards that provide a means of connection between the output device 240 and the system bus 218. It should be noted that other devices and/or systems of devices provide both input and output capabilities such as remote computer(s) 244.

Computer 212 can operate in a networked environment using logical connections to one or more remote computers, such as remote computer(s) 244. The remote computer(s) 244 can be a personal computer, a server, a router, a network PC, a workstation, a microprocessor based appliance, a peer device or other common network node and the like, and typically includes many or all of the elements described relative to computer 212. For purposes of brevity, only a memory storage device 246 is illustrated with remote computer(s) 244. Remote computer(s) 244 is logically connected to computer 212 through a network interface 248 and then physically connected via communication connection(s) 250. Network interface 248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 250 refers to the hardware/ software employed to connect the network interface 248 to the bus 218. While communication connection 250 is shown for illustrative clarity inside computer 212, it can also be external to computer 212. The hardware/software necessary for connection to the network interface 248 includes, for exemplary purposes only, internal and external technologies such as, modems including regular telephone grade modems, cable modems, power modems and DSL modems, ISDN adapters, and Ethernet cards or components.

Figure 3:
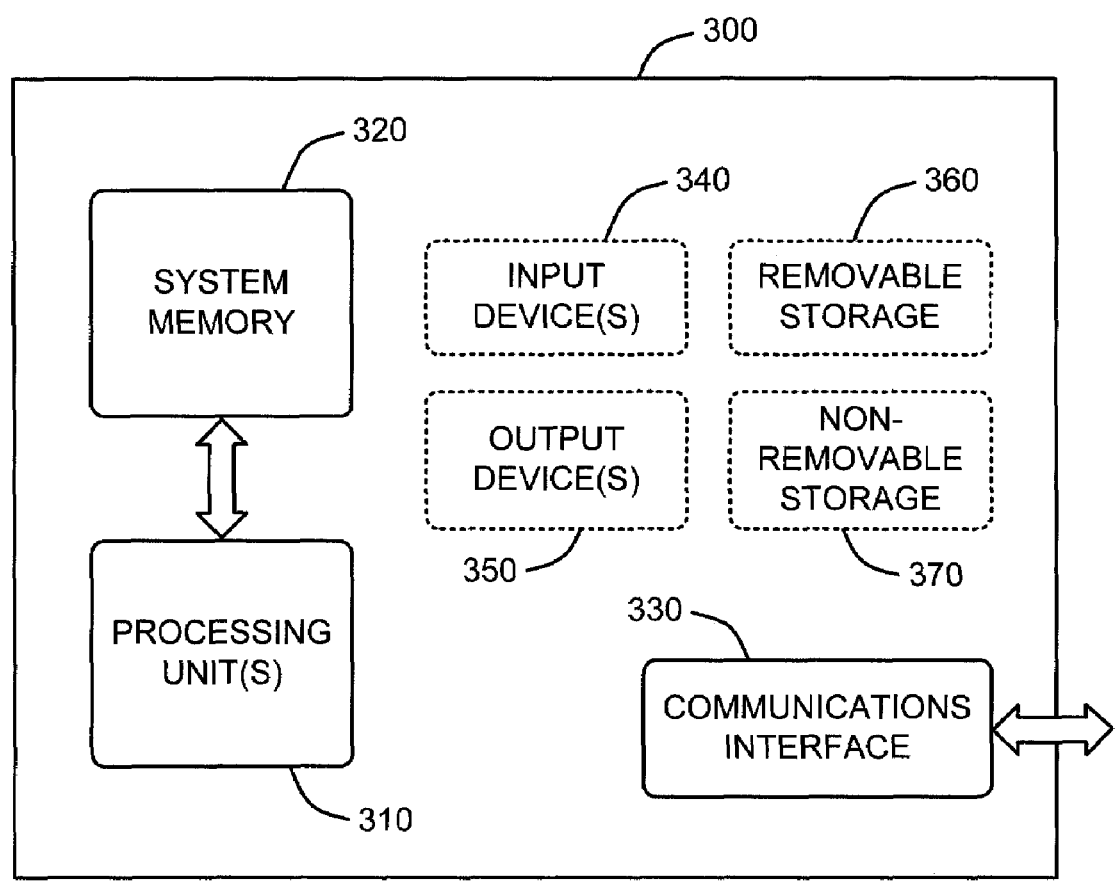
FIG. 3 is a general system diagram depicting a general device having simplified computing and I/O capabilities for use in implementing various embodiments of the Natural Language Script Interface.

With respect to FIG. 3, this figure shows a general system diagram showing a simplified computing device. Such computing devices can be typically be found in devices having at least some minimum computational capability in combination with a communications interface, including, for example, home appliances, security systems, lighting, sensor networks, medical electronic devices, wearable computers, robotics, industrial controls, wired or wireless communication systems, audio nets, distributed computers, toys, games, etc. It should be noted that any boxes that are represented by broken or dashed lines in FIG. 3 represent alternate embodiments of the simplified computing device, as described herein, and that any or all of these alternate embodiments, as described below, may be used in combination with other alternate embodiments that are described throughout this document.

At a minimum, the simplified computing device illustrated in FIG. 3 must have some minimum computational capability and a communications interface. In particular, as illustrated by FIG. 3, the computational capability is generally illustrated by processing unit(s) 310 (roughly analogous to processing units 120 described above with respect to FIG. 1). Note that in contrast to the processing unit(s) 120 of the general computing device of FIG. 1, the processing unit(s) 310 illustrated in FIG. 3 may be specialized (and inexpensive) microprocessors, such as a DSP, a VLIW, or other microcontroller rather than the general-purpose processor unit of a PC-type computer or the like, as described above.

In addition, the simplified computing device of FIG. 3 may also include other components, such as, for example one or more input devices 340 (analogous to the input devices described with respect to FIG. 1). The simplified computing device of FIG. 3 may also include other optional components, such as, for example one or more output devices 350 (analogous to the output devices described with respect to FIG. 1). Finally, the simplified computing device of FIG. 3 may also removable and/or non-removable storage, 360 and 370, respectively (analogous to the storage devices described with respect to FIG. 1).

Figure 4:
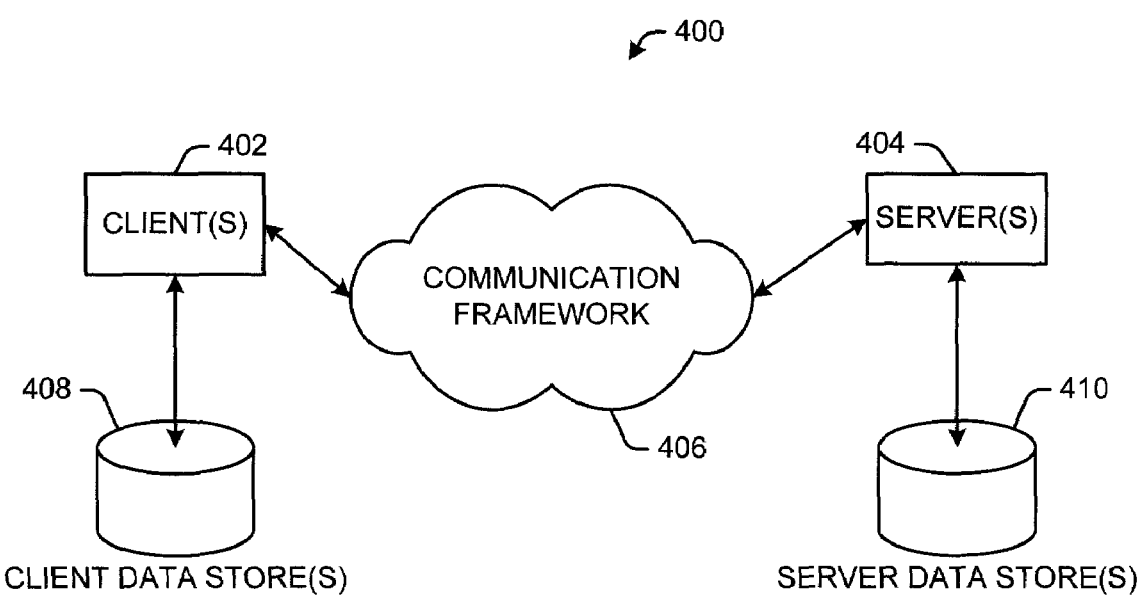
FIG. 4 is a schematic block diagram illustrating a simplified networked computing environment for use in implementing various embodiments of the Natural Language Script Interface.

FIG. 4 is a schematic block diagram of a sample-computing environment 400 with which the present invention can interact. The system 400 includes one or more client(s) 410. The client(s) 410 can be hardware and/or software (e.g., threads, processes, computing devices). The system 400 also includes one or more server(s) 430. Thus, system 400 can correspond to a two-tier client server model or a multi-tier model (e.g., client, middle tier server, data server), amongst other models. The server(s) 430 can also be hardware and/or software (e.g., threads, processes, computing devices). One possible communication between a client 410 and a server 430 may be in the form of a data packet adapted to be transmitted between two or more computer processes. The system 400 includes a communication framework 450 that can be employed to facilitate communications between the client(s) 410 and the server(s) 430. The client(s) 410 are operably connected to one or more client data store(s) 460 that can be employed to store information local to the client(s) 410. Similarly, the server(s) 430 are operably connected to one or more server data store(s) 440 that can be employed to store information local to the servers 430.

The exemplary operating environments having now been discussed, the remaining part of this description will be devoted to a discussion of the program modules and processes embodying the "Natural Language Script Interface" (NLSI).

3.0 Introduction:

Scripts or code, such as Active Content Wizards (ACWs) or other scripts, typically reside locally on a client computer or machine, but can also be downloaded on demand to meet a particular user's needs. In general, ACWs are used to help people discover or perform functionality that may be buried in layers of Graphical User Interfaces (GUIs). However, the ACW mechanism can also be used to enable a much wider range of services and functionality. In fact, the number of applications enabled by the use of ACWs is virtually unlimited. Unfortunately, the shear numbers of available ACWs presents the user with the problem of finding a particular ACW when the user wants it.

To address such issues, a "Natural Language Script Interface" (NLSI), as described herein, provides a natural language interface and query system for automatically interpreting natural language inputs to select, initiate, and/or otherwise present one or more scripts to the user. The NLSI provides a framework that facilitates modeling of advanced semantic constructs for allowing the user to directly locate, execute, or otherwise interact with various scripts or software code, such as an ACW, by using natural language queries as an input mechanism.

In general, the NLSI provides a system and method for managing a pool of scripts or code, available from one or more local and/or remote databases or sets of scripts or code, as a function of a Task Reasoning System (TRS) that operates to map natural language inputs to one or more ACWs or other scripts. In various embodiments, the NLSI operates either as a standalone application running as a process within the overall operating system, or as component that is integrated into existing applications for control of scripts either internal or external to such applications. Natural language inputs may be received from a variety of sources, and include, for example, computer-based text or voice input, handwriting or text recognition, or any other human or machine-readable input from one or more local or remote sources (including for example, a telephone speech server, operating or application systems assistance, web services, and mobile devices such as cell phones or PDAs.

3.1 System Overview:

The NLSI described herein operates to provide natural language-based management and interaction with the ACWs (or other scripts or code) as a function of the TRS. To enable this management, the NLSI first uses the TRS to query each available ACW (or other script or code) to identify a "Task Interface" and any Metadata, if present or required, to seed TRS models with initial mapping criteria. As described in further detail below, the Task Interface generally defines each task (e.g., the script or other code to be executed), the associated data, and the manner in which task data is to be interpreted. The initial mapping criteria are used for mapping various natural language inputs to particular ACWs. Once this initial query/seeding operation has been completed, it is only necessary to repeat the operation for any new ACWs that are added to the pool of available scripts. However, in further embodiments, various learning techniques are used to update or otherwise improve the initial mapping criteria as a function of user interaction with various ACWs or with the NLSI.

Once the mapping of natural language inputs to one or more ACWs via the TRS has been accomplished, the NLSI operates by receiving a query, in the form of a natural language input, either from a calling application or as direct input in the case where the NLSI acts as a standalone application. This query is then passed to the TRS, which identifies the most appropriate ACW(s). Furthermore, in the case where the query includes information that can be used to fill in or complete various slots or variables within any identified ACWs, that information is automatically extracted from the query and used to populate the appropriate portions of the corresponding ACWs.

The TRS then passes the identified ACWs back to the NLSI, which then either executes one or more of the ACWs, as appropriate, and/or presents one or more of the identified ACWs to the user for further user selection or input, as applicable.

Finally, in one embodiment, feedback data, either automatic, or provided via a direct user input to the NLSI, is passed back to the TRS for use in updating the natural language mapping criteria corresponding to particular ACWs.

Figure 5:
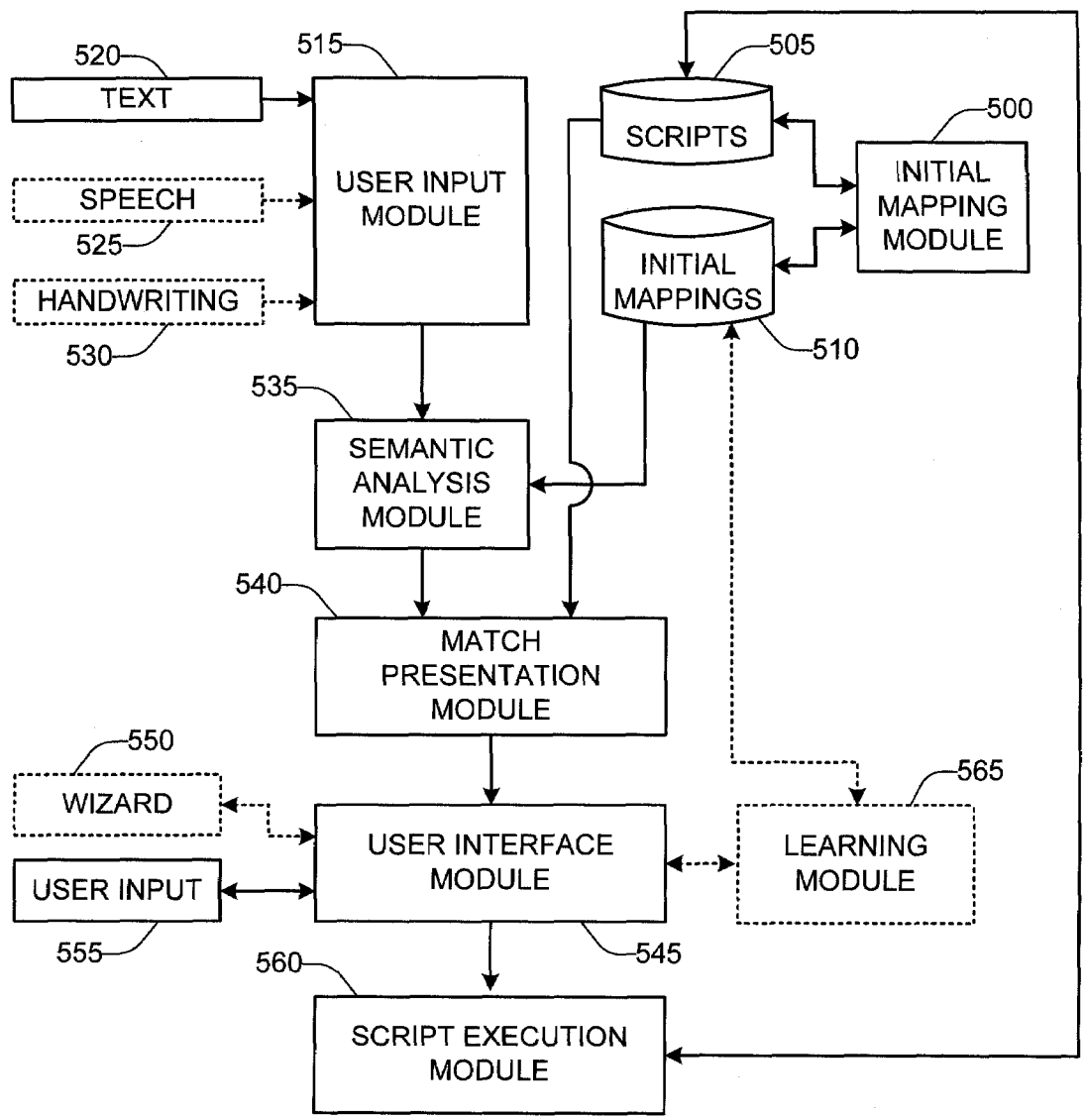
FIG. 5 illustrates an exemplary architectural diagram showing exemplary program modules for implementing various embodiments of the Natural Language Script Interface.

3.2 System Architecture:

The processes summarized above are illustrated by the general system diagram of FIG. 5. In particular, the system diagram of FIG. 5 illustrates general interrelationships between program modules for implementing the "Natural Language Script Interface" (NLSI) described herein. It should be noted that any boxes and interconnections between boxes that are represented by broken or dashed lines in FIG. 2 represent alternate embodiments of the NLSI described herein, and that any or all of these alternate embodiments, as described below, may be used in combination with other alternate embodiments that are described throughout this document.

In general, as illustrated by FIG. 5, the NLSI system described herein begins operation by using an initial mapping module 500 to evaluate a pool of scripts or code 505, available from one or more local and/or remote databases or sets of scripts or code. In performing this evaluation, the initial mapping module identifies a "Task Interface" (see Section 4.1) for each script 505 and uses that Task Interface to generate initial mappings 510 for each script. As described in further detail below, these initial mappings 510 generally represent natural language associations for each script that will be used for matching natural language inputs to one or more of the various scripts.

In particular, the initial mappings 510 are provided to a semantic analysis module along with a natural language query collected by a user input module 515 from one or more inputs, such as, for example, a text input 520, a speech input 525, or a handwriting input 530. The semantic analysis module then deconstructs the user input into a set of one or more "tokens" (see Section 4.2), and acts to identify one or more best or most probable matches between the user input and one or more of the scripts 505 as a function of the initial mappings 510 and the tokens. Note that as part of this matching process, the semantic analysis module 535 also uses tokens, when appropriate, to fill in or otherwise populate one or more variables or "Slots" (see Sections 4.1.1 and 4.2.2) defining the Task Interface of one or more of the identified scripts.

Once the semantic analysis module 535 has identified the best matching scripts 505 to the user input, a match presentation module 540 then presents one or more of the best matching scripts 505 to the user via a user interface module 545. In one embodiment, the user is then provided with the opportunity to select a wizard, such as an Active Content Wizard (ACW) for interacting with or initiating one or more scripts 505 corresponding to scripts selected via the user interface 545. Alternately, the user is presented with the opportunity to provide further input to one or more of the scripts 505, or to select one or more of those scripts for execution via a script execution module 560.

Finally, in one embodiment (see Section 4.3 for additional detail), a learning module 565 evaluates the user interaction with the identified best matching scripts 505, and uses the resulting information for learning better models for updating the initial mappings 510. In a closely related embodiment, any user context associated with either the user input (collected via the user input module 515), or the user interaction with any of the scripts via the user interface module 545 is also used by the learning module 565 for use in updating the initial mappings 510.

4.0 Operation Overview:

The above-described program modules are employed in the "Natural Language Script Interface" (NLSI) for using natural language inputs to manage, access, and control ACWs or other scripts. The following sections provide a detailed operational discussion of exemplary methods for implementing the program modules described above.

4.1 Initial Mapping Criteria:

As noted above, to provide management of the ACWs and TRS, the NLSI first queries each available ACW to identify a "Task Interface" and any Metadata, if present or required, to seed TRS models with initial mapping criteria. In general, as described below, this initial mapping is achieved by evaluating the Task Interface associated with each ACW, or other script to identify possible mappings for each script. As discussed below, the Task Interface of each script provides various metadata and slot or variable information to describe an action or actions to be performed by the script. Consequently, an evaluation, such as a conventional data mining or search of the available pool of scripts allows the NLSI to construct a searchable database, or the like, which includes search criteria such as keywords, task names, variable types, etc.

Note that once this initial evaluation has been performed, it only needs to be performed for new scripts that are added to the available pool of scripts. Consequently, in one embodiment, the initial evaluation can be performed for a predefined set of scripts, and then the searchable database can be provided or made available to multiple users along with the pool of scripts. As a result, duplication of the initial evaluation of a fixed set of scripts doesn't need to be repeated for multiple users.

Once the initial mapping has been performed, the Task Reasoning System (TRS) uses semantic analysis of the user's natural language input, as described in Section 4.2, to determine the best, or most probable, script match or matches to the user query. The best match or matches are then executed and/or presented to the user for further selection, input and/or action.

4.1.1 Task Interface:

In general, the NLSI achieves management and control of scripts by using the idea of a "Task Interface" associated with each script. The Task Interface generally defines each task (e.g., the script or other code to be executed), the associated data, and the manner in which task data is to be interpreted. Identification of the Task Interface by evaluation of each script allows the NLSI to provide initial mapping criteria that are stored in a table or database to which may then be searched as a function of a natural language input. This allows the NLSI to return one or more scripts to the user for user selection, or, depending upon the search results, automatically execute one or more scripts automatically without further user interaction.

In particular, the Task Interface provides various metadata and slot or variable information to describe an action or actions to be performed by the script. The information within the Task Interface of a script can take any of a number of forms. Further, this information can be included in any desired level of detail or complexity. For example, in a tested embodiment, the Task Interface associated with scripts generally include some or all of "Keywords," "Slots," "Pre-Indicators," "Post-indicators," "Types," and "Recognizers." Scripts also include a unique identifier, such as a name or other identifier, for allowing selection of individual scripts once those scripts have been identified as possible or probable matches to the user's query. For example, a script for changing the refresh rate of a display device might be identified as "ChangeRefreshRate" or simply as "Script123."

In general, Keywords are terms that might be used to identify a particular script. These are words that would be entered as part of a user query, provided in the form of a natural language input, as described in further detail below. For example, a script used to change the refresh rate of a display monitor might include Keywords, such as, for example, "refresh," "rate," "display," "monitor," "flicker," etc. Similarly, a script for booking a flight might include keywords such as, for example: "cheap tickets;" "flights;" "flight;" "vacations;" etc.

Clearly, the more keywords that are used, and the better those keywords are tailored to match the script, the easier it will be to identify those scripts. The keywords are generally determined by the software developer at the time that the script is created. However, in one embodiment, as part of the learned updates to the initial mapping, as described in Section 4.3, new keywords are automatically added to particular scripts as a function of observed user interactions with scripts suggested or presented by the NLSI. In a related embodiment, existing or newly added keywords are weighted as a function of observed user interactions with scripts suggested or presented by the NLSI. This weighting serves to either increase or decrease the likelihood of selection of particular scripts as a function of the natural language input of the user.

Slots are parameter values, or variables, used by the script that may or may not be filled automatically filled by performing a semantic analysis of the user's query (i.e., the user's natural language input). In other words, Slots provide information about how to conduct a task or other action and are a holder for piece(s) of data and/or information that may be retrieved from a natural language input. In general, Slots are uniquely specified by their "Name" and "Type." For example, a Slot for a script changing the refresh rate of a display device might have a Name of "RefreshRate." The Slot Type indicates the type of the value of the Slot data. For example, Types can include integers, real numbers, textual strings and enumerated types (e.g., Type "City" can include a list of city names). Similarly, "Recognizers" are possible or valid Slot values that are included directly within the Task Interface rather than defining those values via a separate "Type" list.

Pre-indicators are words that can be useful to disambiguate Slots by occurring before a value in the natural language input of a user query. For example, as described in the example in the following paragraph, in a script for booking an airline flight, a Pre-indicator of "to" as in the input "to Boston" would prefer an "Arrival City" Slot over a "Departure City" Slot even though "Boston" maps to a Type of CITY and can therefore be a value for either Slot. In contrast, Post-indicators are words that might disambiguate Slots by occurring after a value.

For example, a simple example of an XML-based script having a Task Interface is illustrated by the following example:

```
<Task Name="BookFlight" Title= "Book Flights" Description="Find great
       deals on vacations!">
<Keywords>cheap; ticket; tickets; flights; flight; vacations</Keywords>
<Slots>
        <Slot name="Arrival City" type= "CITY">
                <Pre-Indicators>to, going into</Pre-Indicators>
                <Post-Indicators>arrival city</Post-Indicators>
        </Slot>
          <Slot name="Departure City" type= "CITY">
                <Pre-Indicators>from, originating in</Pre-Indicators>
                <Post-Indicators>departure city</Post-Indicators>
          </Slot>
          <Slot name="Arrival Time" type= "TIME">
                <Pre-Indicators>arriving at</Pre-Indicators>
                <Post-Indicators>arrival time</Post-Indicators>
          </Slot>
          <Slot name="Departure Time" type= "TIME">
                <Pre-Indicators>leaving at</Pre-Indicators>
                <Post-Indicators>departure time</Post-Indicators>
          </Slot>
</Slots>
</Task>
```

In this simple example of the Task Interface of a script, the first line includes the task metadata, including the name, title and description. Next, the Task Interface defines the Keywords that can be used to locate the task from a collection, list, or database of tasks or scripts. In this example, the Task Interface includes four separate Slots, "Arrival City," "Departure City," "Arrival Time" and "Departure Time." Each of the Slots includes one or more annotations. For example, the "Arrival City" Slot includes a list of Pre-indicators "to, going into" and a list of Post-indicators "arrival city." The presence of any of those annotations in the natural language input provided as a part of the user query will indicate the presence of a value to be used to populate the Arrival City Slot. For example, the query: "I want a flight from Boston with an 8:30 departure time" would be processed by the NLSI as follows:

Because "from" is a Pre-indicator of the "Departure City" Slot, the term "from Boston" would be used to populate the "Departure City" Slot with the value "Boston" even though Boston maps to CITY and can be a legitimate value for either the "Arrival City" Slot or the "Departure City" Slot.

Because the term "departure time" is a Post-indicator of the 8:30 "Departure Time" Slot, the time "8:30" will be used to populate the "Departure Time" Slot even though "8:30" could technically be used to populate either the "Departure Time" Slot or the "Arrival Time" Slot.

It should be noted that the example user query provided above failed to include an arrival city, and to specify whether the departure time was AM or PM. Consequently, as discussed in further detail below, when the NLSI presented the results of the script search to the user, the user would be allowed to either manually complete the missing information, or to select that information from a list of valid entries.

Other simple examples of natural language inputs that would be applicable to the exemplary Task Interface described above are queries such as, for example, "I want a flight from Boston with a 8:30 PM departure time with 2 adults and 1 child" or "buy a ticket from Seattle to New York leaving at 5:15 PM."

Another simple example of a Task Interface for a script, which acts to change the refresh rate of a computer display device, is provided below:

```
<Task Name=" ChangeRefreshRate">
    <Keywords>change;refresh;rate;flicker;hertz;hz</Keywords>
    <Slots>
        <Slot name="RefreshRate" type= "Rate" />
    </Slots>
    <Entities>
        <Entity name="Rate" />
    </Entities>
    <Recognizers>
        <Recognizer name="Rate">65;75;85;95</Recognizer>
    </Recognizers>
</Task>
```

Note that in the preceding example script, an "Entity" name and associated "Recognizer" values for valid refresh rates are used in place of a Type that defined refresh rates. However, it should be clear that a Type could have been used ether in combination with, or in place of the predefined Recognizer values with the associated "Rate" "Entity." A simple example of a valid user query for the task interface illustrated above might be, for example, "change refresh rate to 75 hertz."

It should be appreciated by those skilled in the art that the aforementioned elements of the Task Interface (Slots, Keywords, Types, etc.) are provided for purposes of explanation only, and that the Task Interfaces associated with scripts used by the NLSI are not intended to be limited to the above-described elements of the Task Interface. For example, as noted above, the information within the Task Interface of a script can take any of a number of forms, and can be included in any desired level of detail or complexity. Consequently, it should be clear that other elements of information may be added to the Task Interface without departing from the scope of the NLSI as described throughout this document.

4.2 Task Reasoning System:

Once the initial mapping of natural language inputs has been accomplished via evaluation of the Task Interface, as described above, the NLSI operates by receiving a query, in the form of a natural language input, either from a calling application or as direct input in the case where the NLSI acts as a standalone application. This query is then passed to the TRS, which identifies the most appropriate ACW(s) or other scripts via a semantic analysis of the natural language input. Furthermore, in the case where the query includes information that can be used to fill in or complete various Slots or variables within any identified ACWs, that information is automatically extracted from the query and used to populate the appropriate portions of the corresponding ACWs.

In other words, given the initial mappings, the NLSI acts to perform some or all of the following functions:

Receive an input query in the form of a natural language input;

Identify and retrieve a set of one or more likely scripts given the input query;

Fill out applicable Slot values for each script as a function of a semantic analysis of the input query with respect to each retrieved script;

Execute and/or present the retrieved scripts to the user; and

Optionally modify the initial mappings as a function of observed user behaviors.

Figure 6:
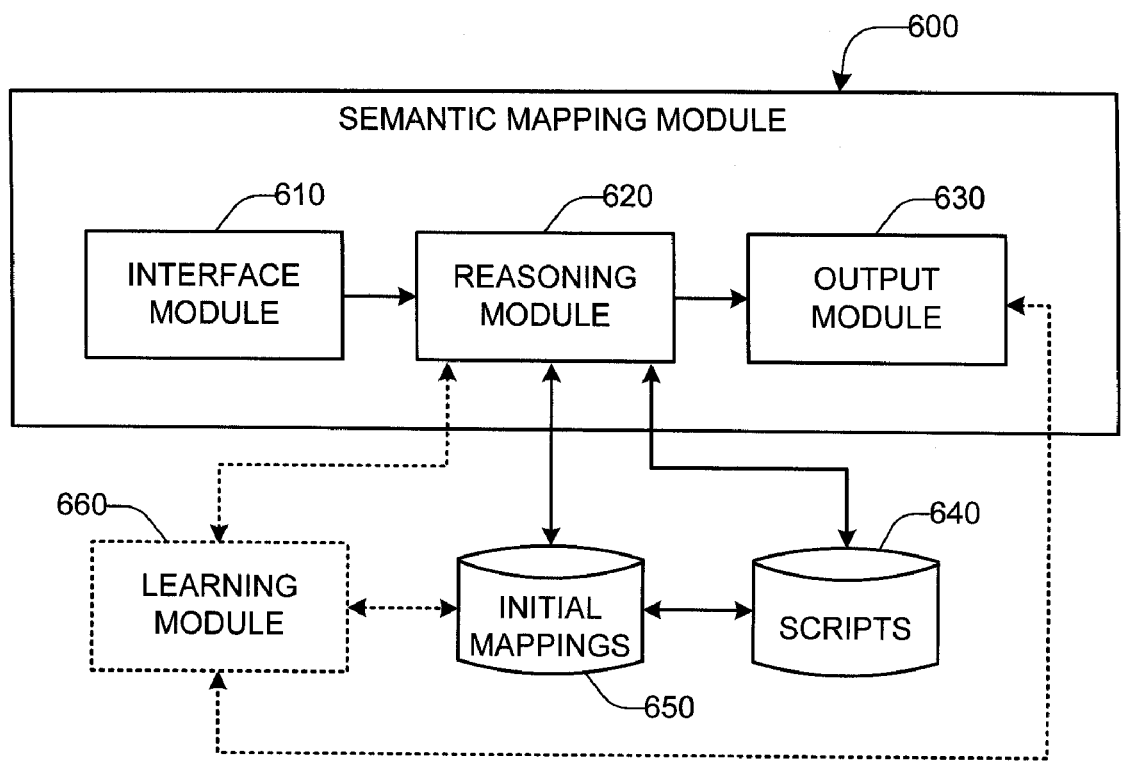
FIG. 6 illustrates an exemplary architectural diagram showing exemplary program modules for implementing a semantic analysis module of the Natural Language Script Interface.

For example, as illustrated by FIG. 6, in one embodiment, the NLSI includes a semantic mapping module 600 which further includes an interface module 610 that receives a query (natural language input) from a user and/or entity (e.g., the Internet, another system, a computer, etc.). The semantic mapping module 600 of the NLSI also includes a reasoning module 620 that evaluates the initial mappings 650 of the available scripts 640 to semantically map the input provided via the interface module 610 to one or more scripts 640. Finally, the semantic mapping module 600 of the NLSI also includes an output module 630 that selects one or more of the best or most likely scripts 640, based on the user input, and provides those scripts to the user and/or other entity (referred to as "user"), and/or executes the scripts, as appropriate. In one embodiment, the semantic mapping module 600 of the NLSI also includes a learning module 660 that uses conventional learning techniques to update the initial mappings 650 as a function of observed and/or learned user behavior and context.

In particular, the interface module 610 is configured to receive or accept a user input (e.g., statement, query, context, etc.) in a plurality of forms such as typing, writing, selecting, talking, or other interactive techniques. Further, the interface module 610 provides various types of user interfaces for receiving the user input. For example, a graphical user interface (GUI) allows users to express their intentions by directly manipulating the graphical and/or textual objects displayed on display device. Similarly, a voice user interface (VUI) allows users to express their intentions by interpreting a speech input provided by the user. GUI and VUI are techniques for structuring and presenting the "application semantic space" in a form that helps the user to map, manipulate, interact with, and achieve their intentions.

For example, in one embodiment, a GUI is rendered to provide the user with a region or means to load, import, input, etc. a query, statement, request, etc. and can include a region to present the results of such query, etc. In various embodiments, these regions comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation of results or actions may be provided that include vertical and/or horizontal scroll bars for navigation and toolbar buttons to determine whether a region will be viewable can be employed. The user may interact with the interface module 610 by entering the query or information into an edit control.

The user can also interact with the interface module 610 to select and provide information through various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the embodiments are not so limited. For example, merely highlighting a check box can initiate information conveyance. In another example, a command line interface can be employed. For example, the command line interface can prompt (e.g., through a text message on a display and/or an audio tone) the user for information by providing a text message. The user can than provide suitable information, such as alpha-numeric input corresponding to an option provided in the interface prompt or an answer to a question posed in the prompt.

It should be understood by those skilled in the art that the command line interface can be employed in connection with a GUI and/or application program interface (API). In addition, the command line interface can be employed in connection with hardware (e.g., video cards) and/or displays (e.g., black and white, and EGA) with limited graphic support, and/or low bandwidth communication channels.

In general, the semantic mapping module 600 of the NLSI is guided by the principle that recognizing a user intention is an adaptive pattern recognition problem where the patterns to be recognized are the domain entities and tasks because the representation eventually should point to what needs to be done in the application. In addition, in a related embodiment, the semantic mapping module 600 is also guided by the principle that advanced pattern recognition applications are seldom carried out in a single step, but in a manner that involves multiple processing stages.

The reasoning module 620 is configured to receive the user input and leverage a plurality of types and sources of information to achieve reasoning, presentation and/or action. In various embodiments, a variety of technologies are employed by the reasoning module 620 including, for example, information retrieval (IR), Slot filing and learning (feedback on an asset and Slot level) via the learning module 660, or a combination thereof, to map the user intent to an action.

In addition, the reasoning module 620 provides an adaptive shared infrastructure that is easy to use and enables natural interaction between a user and a machine (e.g., computer, computing device, electronic device, and the like). For example, the reasoning module 620 allows the user to input an intent, query, statement, etc., in a natural language format, such as "I want to find a flight from Boston to Seattle" into the interface module 610. The reasoning module 620 then maps the statement into some action (e.g., set of tasks or scripts) with the result being "departure is Boston" and "arrival is Seattle." Thus, the semantic mapping module 600 of the NLSI allows a transformation from a natural language query to an underlying semantic representation through reasoning and may present results or take action(s) intelligently, though the output module 630.

Further, in one embodiment, the reasoning module 620 is configured to be adaptive by utilizing feedback through measuring and/or learning techniques via the learning module 660. For example, referring to the above airline flight example, another user may initiate the same query by inputting "I want a flight going towards Boston" while yet another user may input "I want a flight heading to Boston." The semantic mapping module 600 will accept each of these inputs and learn how different users are phrasing the same intent or desired action (e.g., "going towards" vs. "heading to"). The reasoning module 620 will then apply such feedback to a variety of statistical models for updating the initial mappings 650 for use in better identifying tasks or scripts in response to future user queries.

4.2.1 Semantic Analysis:

In general, semantic analysis attempts to match a natural language input to certain tasks or actions provided by an automated system. Typically, semantic processing breaks the natural language input into strings of characters called tokens. The NLSI described herein provides a system that analyzes these tokens as well as the user "context" in which the natural language input was provided to determine the appropriate task or tasks. Scripts, ACWs or other code corresponding to the identified tasks are then either executed automatically, or presented to the user for further input or selection, as described in further detail below. The user context may include any information that indicates the user's current state, such as recent user actions, any software applications active on the user's computer or any other information indicative of the user's state.

Scripts may require information from the natural language input. In other words, such scripts frequently include slots or variables (described as "Slots" in Section 4.1.1) that provide information about how to conduct the task to be performed by the script.

For example, an airline reservation system can include a script for booking a flight, where the script includes Slots for the arrival and departure cities, the arrival and departure dates and the number of passengers. The information required for such Slots or variables can be retrieved from a natural language input (e.g., "I want a flight from Boston to Seattle with 2 passengers leaving on May 8, 2005 and returning on May 25, 2005"). In another example, a word processing application can include a script (entitled "CreateTable," for example) for automatically creating a table, having Slots for the number of rows and columns and a line style. Those Slots can receive values from the natural language input (e.g., "Insert a 2 by 4 table with dotted lines"). Thus, a "Slot" or variable, as described herein, is a holder for piece of data or information that may be retrieved from the natural language input.

Determining possible mappings from natural language input to the appropriate script Slots is a complex problem that may be solved using a variety of different mathematical techniques. Conventional techniques for providing such mappings include, for example, Hidden Markov Models (HMM), Maximum Entropy/Minimum Divergence Models (MEMD), Naïve Bayes (NB), and Heuristic (i.e. rule-based) approaches. Many techniques utilize a searching or decoding strategy (e.g., a Viterbi search, Beam search, A* search or other algorithm) to determine the best solution out of a set of possible solutions.

However, in addition to the techniques noted above, in various embodiments, the NLSI described herein also uses the semantic analysis techniques described below to provide the possible mappings for each script.

For example, as noted above, semantic mapping of the user's natural language input is provided with respect to the initial mappings of the available scripts. In providing this mapping, a "user" first inputs a natural language query. This natural language query is analyzed in order to search for and determine appropriate task/script cross-mapping, and to probabilistically rank the cross-mapping results in order of likelihood.

To perform these semantic analysis and cross-mapping actions, the NLSI first receives the user's natural language input (e.g., statement, query, request, and the like) through a user interface. This input is then broken or divided into a "token" or set(s) of tokens, with each tokens representing a string of characters. Various technologies can be utilized for performing this search and discovery, such as, for example, a conventional information retrieval system, query classifier, context classifier, and/or a combination of these techniques. Further, there are various ranking systems that can be utilized by these techniques. For example, an information retrieval system can utilize an Okapi-based ranking system, a query classifier (query to script mapping) can utilize a Naïve-Bayesian model, and a combined query and context (se below) can utilize a maximum entropy minimum divergence (linear discriminative) model.

In addition, or alternatively, the user input may include a context(s). Context can be a representation of recent user actions (e.g., clicking on items, inserting input somewhere, etc.), software applications active on the user's computer (e.g., having a table open, having certain applications running, etc.) or other information indicative of the user's state. Anything that describes the application state or what action(s) the user has performed can be a context. For example, for a given input users may tend to click on a certain document and the terms included in the input can change over time, depending on what a user clicks or selects. In one embodiment, this user context information can be fed back to the NLSI continuously or periodically to provide for learning, as described in further detail below.

In order to divide the input into a token or set(s) of tokens, the semantic analysis of the user input is used to evaluate statements, such as, for example, "I want to find a flight from Boston to Seattle" and to break that statement into tokens. In this case, each token represents either one word (e.g., "I," "want," "to," "find," etc.) or a phrase ("I want to find," "a flight," etc.). In various embodiments, this semantic analysis is configured to recognize key words, terms, phrases, and the like, which can be referred to as named entity recognition. Further, this semantic analysis can be achieved by leveraging a word breaking and/or named entity recognition architecture. For example, this semantic analysis can be configured to recognize city names, states, dates, times, or other terms depending on the query input and the particular mapping to be performed. In further embodiments, the semantic analysis is configured to integrate and support a distributed word breaking technique, a tiered named entity recognizer technique, and/or task framework techniques to map user intent, perform actions, and/or provide feedback for use in learning operations, as described below.

Once the user input has been broken into tokens, a search is performed using those tokens to find or return the best tasks or scripts relative to the initial mappings extracted from the available scripts. utilizing the token and/or context and determine an appropriate database to utilize. In general, this searching employs any of a number of conventional search techniques, including, for example, query classification, information retrieval, and/or context classifiers to find and determine the best matches between the tokens and the initial mappings of the available tasks or scripts.

For example, this may be achieved by retrieving the top N assets given a query and a set of context, where N is an integer equal to or greater than zero. For example, given a user input of "make table" the NLSI would retrieve scripts capable of creating tables. Possible script results returned by this search could include, for example, scripts for creating a table that may include contents, figures, or other information, such as:

1. Script Match #1: "Create a table";
2. Script Match #2: "Create a table of contents";
3. Script Match #3: "Create a table of figures".

Once one or more matching scripts are identified, "Slots" are filled as described in Section 4.1.1. As noted above, Slots provide information about how to conduct a task or other action and are a holder for piece(s) of data and/or information that may be retrieved from a natural language input. In general, Slot filling serves to fill in parameters for the potential tasks or scripts. Slot filling may be performed utilizing a plurality of algorithmic methods and/or techniques.

For example, an airline reservation system can include a "Book Flight" task that includes Slots for the arrival city, departure city, arrival date/time, departure data/time, number of passengers, etc. The information to be inserted into each Slot can be retrieved from the natural language input (e.g., "I want a flight from New York to San Diego with 2 passengers leaving on Feb. 5, 2006, and returning on Feb. 21, 2006."). In another example, a word processing application can include a "Create Table" task having Slots for the number of rows, number of columns, line style, etc. The Slots can receive values from a natural language input (e.g., "Insert a 4 by 7 table with dashed lines."). Determining possible mappings from natural language input to the appropriate task or script Slots can be solved utilizing a variety of different mathematical or statistical learning techniques such as Hidden Markov Models (HMM), for example.

In one embodiment, ranking of the various scripts returned by the semantic analysis of the user input involves an evaluation of the Slots filled as a function of the semantic analysis and subsequent matching of the input to one or more potentially matching tasks or scripts. In general, as described in further detail below, the term "Slot filling goodness" or simply "goodness" is used to refer to successfully filled Slots in a Script. The Slot filling analysis can be accomplished by various algorithms (e.g., final ranking algorithm), methods, and/or techniques. Further, the Slot filling results may be (re)ranked differently depending on various factors, including the Slot filling goodness. In one embodiment, this slot-filling goodness is used in generating a final ranking or score for each script by combining ranking scores from traditional information retrieval, query classifier and Slot-filling. Several options can be utilized including, learning weights of individual scores using a MEMD model, interleaving, and/or simple summation/product.

For example, in one embodiment, if a user query is input into the NLSI and multiple potentially matching scripts are found following semantic analysis of that natural language input, a determination is made as to which scripts to execute and/or present to the user. In one embodiment, two sub-scores are generated, one for the information retrieval portion and one for the query classifier portion of the semantic analysis-based script matching. Next, the structure of the script (i.e., the above-described "Task Interface") is reviewed relative to the semantic analysis, and a ranking is performed on the script structure, producing yet another sub-score. Each of these sub-scores is then combined to determine a final score based on each of the sub-scores. In one embodiment, this final score, or ranking, is then used to provide feedback to improve performance of future queries for the current and/or future users.

In view of the preceding discussion, it should be clear that a "semantic solution" as returned by the semantic analysis is a representation of possible or probable mappings of "tokens" to scripts and/or Slots defined by the Task Interface of those scripts. In one embodiment, this semantic solution is provided in a human readable format for presentation to the user for further user verification of the semantic analysis. For example, in one embodiment, the semantic solution is presented to user either as simple text or in a graphics display highlighting the probable semantic structure of the natural language user input. Further, a hierarchical, tree structure representation may assist users in recognizing interpretations of natural language input. Note that for tasks or scripts that have not implemented any slots, the semantic solution will contain no semantic condition elements.

Consider the following exemplary XML-based human-readable semantic solution for the simple query "I want a flight from Boston leaving on Mar. 31, 2006" for the aforementioned "BookFlight" script:

```
<SemanticSolution Input="I want a flight from Boston leaving on
10/23/05"
    Score="3.808E-06">
        <SemanticConditions>
            <SemanticCondition SlotName="Departure" SlotType="
            City">
                <SemanticValues>
                    <SemanticValue Type="City"
                    Value="Boston"/>
                </SemanticValues>
            </SemanticCondition>
            <SemanticCondition SlotName="Arrival"
            SlotType="Date">
                <SemanticValues>
                    <SemanticValue Type="Date"
                    Value="10/23/05"/>
                </SemanticValues>
            </SemanticCondition>
        </SemanticConditions>
</SemanticSolution>
```

In the preceding example, the semantic solution includes the natural language input as well as a "score" that can be used to rank semantic solutions. The semantic solution includes a "Departure" Slot and an "Arrival" Slot. The "Departure" Slot contains a "City" Type value of "Boston" and the "Arrival" Slot contains a "Date" Type value of "Mar. 31, 2006."

Consider the additional exemplary XML=based human-readable semantic solution for the query "create a 2 by 4 table with dashed lines" for the aforementioned "CreateTable" task:

```
<SemanticSolution Input="2 by 4 dashed" Score="0.22407">
    <SemanticConditions>
        <SemanticCondition SlotName="Columns"
        SlotType="Integer">
            <SemanticValues>
                <SemanticValue Type="Integer" Value="2"/>
            </SemanticValues>
```
-continued
```
        </SemanticCondition>
        <SemanticCondition SlotName="Rows" SlotType="Integer">
            <SemanticValues>
                <SemanticValue Type="Integer" Value="4"/>
            </SemanticValues>
        </SemanticCondition>
        <SemanticCondition SlotName="LineStyle"
        SlotType="LineStyle">
            <SemanticValues>
                <SemanticValue Type="LineStyle"
                Value="dashed"/>
            </SemanticValues>
        </SemanticCondition>
    </SemanticConditions>
</SemanticSolution>
```

In the preceding example, the semantic solution includes a "Columns" Slot, a "Rows" Slot and a "LineStyle" Slot. The "Columns" Slot contains an integer value "2", the "Rows" Slot contains an integer value "4," and the "LineStyle" Slot contains a "LineStyle" Type value of "dashed."

4.2.2 Slot Filling:

As noted above, Slots in potentially matching scripts are filled by the TRS as a function of the semantic analysis of the natural language input provided by the user. In general, the filling of Slots can be accomplished either by extracting tokens directly from the user input, or by retrieving corresponding information from one or more databases or other sources of information. In other words, in response to the semantic analysis of the user input, the NLSI can receive, request, search, obtain, etc., information from one or more remote or local data stores. Consequently, in various embodiments, Slot filling determinations can be bootstrapped by authored data, such as annotations and/or sample queries.

Further, such Slot-filling determinations can be improves by using feedback data for "learning" better information for filling particular Slots for particular users or particular scripts. For example, statistical learning techniques, such as HMM can be utilized for semantic Slot filling. In one embodiment, Slot filling can take a set of tokens and construct a semantic solution that represents the best mapping of the input query to some pre-specified structure. For example, the NLSI will perform Slot filling by converting a query, such as, for example: "I want a flight on XYZ Airline leaving tomorrow morning from Boston or Manchester and arriving in Seattle or Portland" to a semantic representation such as:

```
BookFlight[ airline= "American", DepartureTime=Tomorrow-
Morning, DepartureCity=("Boston" or "Manchester"),
ArrivalCity=("Seattle" or "Portland")]
```

As noted above, in one embodiment, the Slots are ranked. The purpose of ranking, or re-ranking, the Slots is to achieve an action or output (i.e., a script identification) that is as close as possible to the most probable desired intent as communicated by the user in the natural language query. In various embodiments, any of a number of algorithms, methods, techniques (e.g., MEMD for overall ranking), etc., are used to perform this ranking function.

Mapping of user intent can be treated as an adaptive pattern recognition problem and reasoning models (generative/discriminative) can be imposed to achieve proper maps and/or adaptation. For a particular task or script, multiple ranking mechanisms (e.g., information retrieval, query and context classifiers, structured Slot ranking, etc.) can be utilized. Managing the combination of scores from individual features to produce a single rank may be solved by a global ranker technique.

In yet another embodiment, the NLSI uses MEMD for query plus context to perform or intent-to-action mapping between the user input and one or more tasks or scripts. Ranking algorithms, methods, and/or techniques that enable Slot matching and filling are utilized. These ranking algorithms can further combine feature scoring components in an adaptive method (e.g., global ranking). As a result, the Slot filling and ranking can be considered to be a multistage process that invokes any or all of information retrieval, click through query classifier (CTM), click through context classifier (CXM) and/or a Slot filing system.

4.3 Learned Updates to the Initial Mapping:

As noted above, once the initial query/seeding operation has been completed to provide the initial mappings of the available scripts for use in the subsequent semantic analysis of the user input, it is only necessary to repeat that operation for any new scripts or ACWs that are added to the pool of available scripts. However, in further embodiments, various learning techniques are used to update or otherwise improve the initial mapping criteria as a function of user interaction with various ACWs or with the NLSI, and/or any observed "context" relative to the user input or selection of the various scripts.

In general, any of a number of conventional learning techniques can be used in various embodiments. For example, such learning techniques include, for example, statistical learning models (e.g., Hidden Markov Model (HMM) for semantic slot-filling, Naïve-Bayesian model for Information Retrieval (IR), Max Entropy Min Divergence (MEMD) for ranking and/or query and context to script mapping).

In particular, in various embodiments, feedback data, either automatic, or provided via a direct user input to the NLSI, is passed back to the TRS for use in learning updated natural language mapping criteria (initial mappings) corresponding to particular scripts or ACWs. In addition, these learned updates may also be applied to the probabilistic Slot filling techniques described herein, and/or to the semantic analysis models used in evaluating the natural language inputs provided by the user.

For example, as noted above, the NLSI provides a mechanism to learn from user behavior such that if users start entering queries such as, for example, "departing Boston for Seattle" to mean "Departure City"="Boston" and "Arrival City"="Seattle," the system will automatically learn the pattern "departing <Departure City> for <Arrival City>" without needing to explicitly add new Pre- or Post-indicators to the Task Interface of any corresponding scripts. This information would then be used in combination with the initial mappings. Alternately, this learned information can be added directly to the Task Interface and/or initial mappings of the corresponding scripts. In either case, the effect is that the learned behavior of the user is used to enhance script selection and/or Slot filling.

Specific examples of techniques for enabling the learning capabilities of the NLSI include the use of user interaction flow instrumentation for feedback enablement and learning. For example, in various embodiments, mechanisms (e.g., interfaces, flows, etc.) are provided for acquiring user explicit and/or implicit feedback. Explicit feedback can be provided through, for example, a user interface, such as user rating, forms and/or dialogs. Implicit feedback can be provided through click-through or user selections. Examples of implicit feedback include whether a user clicks on (e.g., selects) a previous or next script or task list marker or whether a user clicks on the most likely script resulting from the semantic solution. Further examples include the response to a prompt (e.g., "Were all task slots relevant filled out?"), whether the user filled in missing Slots, whether a user selected "OK" to execute a task or cancelled the task, etc.

The NLSI then uses learning techniques, such as, for example, machine learning, artificial intelligence, etc., to learn from this feedback (explicit and/or implicit) to improve the performance and capabilities of the NLSI. Further, in one embodiment, given the gathered feedback, the accuracy, precision and recall of scripts by the NLSI can also be determined.

For example, in one embodiment, the NLSI is configured to automatically solicit or receive information through a feedback mechanism. In this embodiment, the NLSI monitors user interaction with the Script list presented to the user as a function of the semantic analysis of the user input and further evaluates the selection, execution, and/or cancellation of one any of those scripts.

In particular, in the aforementioned embodiment, the results of any mapped scripts (i.e., scripts potentially matching the user input) are presented to the user via a user interface. In one embodiment, the user is then prompted via its user interface to determine, for example, whether the user would like a particular script or task to be performed or executed. If the user would like the script or task to be performed or executed, the NLSI causes the script to be executed, as directed. Conversely, if the user does not want a selected script, or even any script, to be executed, the user can simply cancel the current script, or entire script list, and input another inquiry or perform other actions, as desired.

As noted above, in one embodiment, user feedback (implicit or explicit) is evaluated as a function of script selection and execution status. For example, as described above, the NLSI first receives a natural language input signal, which includes a user query, and potentially a context. As a function of the semantic analysis of the input signal, a ranked order of predicted Slot filled scripts is determined. There can be from one to N predicted or probable scripts or tasks (e.g., Predicted Script #1; Predicted Script #2, . . . , Predicted Script #N), where N is an integer greater than or equal to one.

Each of these N predicted Scripts is the highest semantic solution (e.g., best Slot fill solution). The order of prediction (ranking) and its relevance per prediction is then compared to the other candidate predictions. Feedback on the set of predicted Scripts is then used to learn more suitable rankings with respect to future user queries.

For example, the user feedback can be provided by the click through of a predicted script (e.g., selected task), which is also the best Slot filling solution (as determined by the user and/or autonomously by system). The user may click through based on a relevant title, summary, or other criteria. Rating, comparison and/or feedback can also be provided on a user's overall level of satisfaction with the presented list of predicted scripts by providing a user interface, such as a clickable rating form, for example, to allow the user to indicate the user's overall satisfaction with the presented list, or of individual elements within that list.

Further, in one embodiment, once a script is selected, the order of Slot filled semantic solutions per script is ranked. This ranking can include from one to N predicted Slot fill solutions (e.g., Predicted Slot Fill Solution #1, Predicted Slot Fill Solution #2, . . . , Predicted Slot Fill Solution #N), where N is an integer greater than or equal to one. In other words, each individual script may have more than one possible Slot filling configuration as a function of the semantic analysis of the natural language input. In this case, each predicted semantic solution is rank ordered. The order of prediction (ranking) of each Slot fill solution and its accuracy compared to other candidate predictions is then evaluated as a function of user interaction with the presented script.

One simple way to obtain the information required for evaluation of Slot filling performance is to allow the user to select the desired script from the predicted list of scripts, then to present the user with one or more of the possible variations of that script resulting from the various "Predicted Slot Fill Solutions" for the selected script. User selection of the script having the best Predicted Slot Fill Solution then provides the NLSI with the feedback necessary to learn from the user interaction with the script as a function of predicted Slot filling solutions. In addition, in a related embodiment, a user rating and/or comparison feedback is provided via a user interface to allow the user to specify a level of satisfaction for one or more of the "Predicted Slot Fill Solutions." This information is then used to improve future Slot fill solutions as a function of the user's natural language inputs.

As discussed above, Slots within scripts presented to the user may or may not be completely filled by extracting relevant information from the natural language input. Consequently, if the Slots of a particular script are not completely filled, it may be necessary for the user to provide additional information in order for a selected script to be properly executed. Consequently, if the selected script is only partially Slot filled, the NLSI presents the user with a user interface for completing or otherwise identifying the information required to fill any incomplete Slots. Once all Slots have been filled, the script is then ready for execution. Further, the NLSI monitors the Slot filling activity of the user with respect to the selected script, and learns from this information to provide enhanced Slot filling and script prediction for future natural language inputs.

In other words, in view of the preceding discussion, it should be clear that in various embodiments, the NLSI acts to learn better script selection and better Slot filling as a function of user selected scripts, user filled Slots, and user satisfaction with either or both the predicted scripts and the predicted Slot filling solutions.

5.0 Operational Implementation of the NLSI:

As noted above, the program modules described in Section 3 with reference to FIG. 5 and FIG. 6 are employed to enable a "Natural Language Script Interface" (NLSI) for providing an interface and query system for automatically interpreting natural language inputs to select, execute, and/or otherwise present one or more scripts or other code to the user for further user interaction. For purposes of explanation, the processes described above are further summarized below with respect to FIG. 7 which generally illustrates several embodiments of the NLSI described herein. It should be noted that any boxes or connecting lines that are represented by broken or dashed lines in FIG. 7 represent alternate embodiments of the NLSI, as described herein, and that any or all of these alternate embodiments, as described below, may be used in combination with other alternate embodiments that are described throughout this document.

Figure 7:
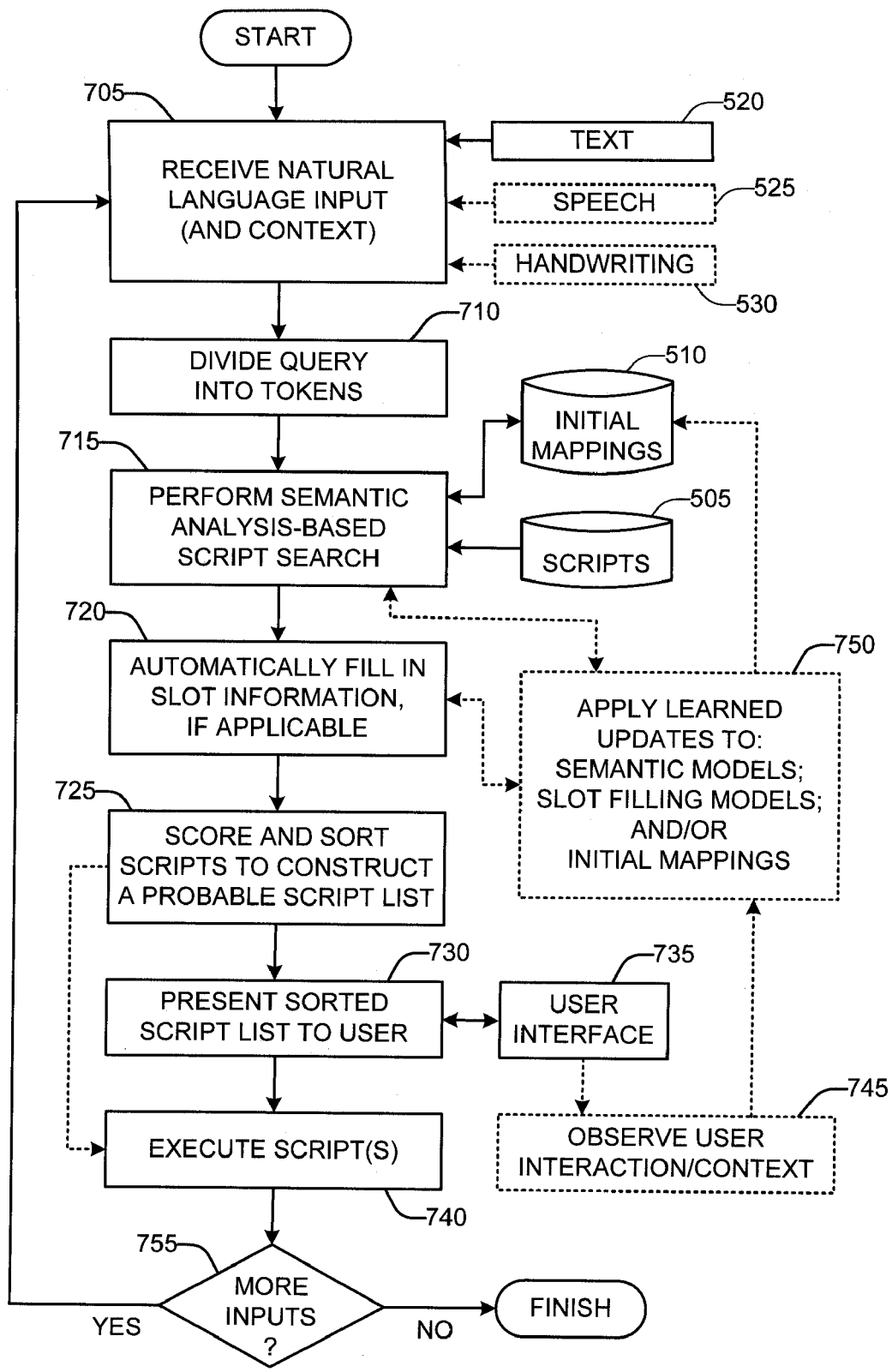
FIG. 7 illustrates an exemplary system flow diagram for implementing various embodiments of the Natural Language Script Interface.

In general, as illustrated by FIG. 7, the NLSI begins operation by receiving 705 a natural language input. As described above, this natural language input may be provided from any of a number of conventional sources, including for example, text inputs 520, speech inputs 525, and handwriting inputs 530, to name only a few such input sources.

Once the natural language input has been received 705, it is divided into a number of "tokens" (strings of characters suitable for semantic analysis). These tokens are then used in combination with the initial mappings 510 associated with the available scripts 505 to perform a semantic analysis 715 of the natural language input relative to the available scripts. This semantic analysis 715 acts to identify one or more scripts that are most likely to match the user's intent, relative to the natural language input. Note that as described above, the initial mappings 510 of the scripts 505 are either generated by the NLSI prior to receiving natural language inputs from the user for evaluation, or are provided from a separate source as an adjunct to the scripts 510.

In addition to matching the probable intent of the user to one or more scripts 505, the NLSI also uses the semantic analysis of the natural language input to automatically fill in one or more Slots of the identified scripts, if applicable or possible.

Once the scripts have been identified, and any slots filled, if applicable or possible, the identified scripts are scored and ranked 725 in order of most probable to least probable matches to the users presumed intent, in order to construct a probable script list. The probable script list is then presented 730 to the user via a user interface 735. In various embodiments, the user interacts with one or more of the presented scripts via the user interface 735 to select, complete, and/or execute 740 one or more of the identified scripts, as described above. Alternately, in one embodiment, one or more of the most probable scripts in the probable script list are executed 740 automatically without requiring further user interaction.

Further, in another embodiment, the NLSI observes 745 user interactions with the various scripts, and/or the context of those interactions. These observations 745 are then used by various machine learning techniques 750 are to improve script selection and processing by updating semantic models used to perform the semantic analysis 715, the automatic Slot filling 720, and/or the initial mappings 510.

Finally, the processes described above continue for as long as there are additional user inputs 755 to process.

Figure 8:
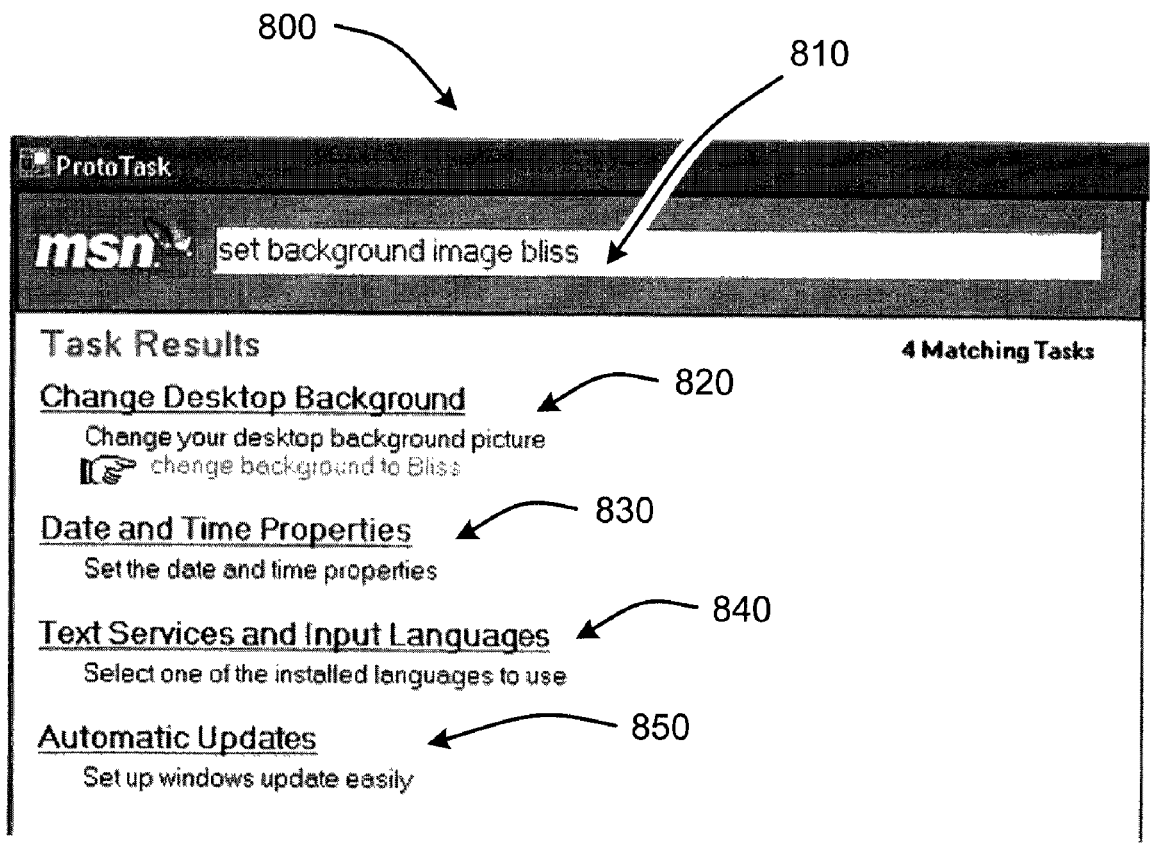
FIG. 8 is an image of an exemplary user interface window showing a user selectable list of probable tasks to be performed in response to a natural language query.

6.0 Example of a Tested Embodiment of the NLSI:

A simple example of a tested embodiment of the NLSI is illustrated with respect to FIG. 8 through FIG. 11. In particular, in this example, as illustrated by FIG. 8, a GUI type user interface window 800 is presented to the user for entry of a natural language input 810. In this case, the user enters the natural language input "set background image bliss." The NLSI evaluates this natural language input 810 and returns a list of four potentially matching tasks/scripts (820 through 850), as follows:

1. Change Desktop Background (820);
2. Date and Time Properties (830);
3. Text Services and Input Languages (840); and
4. Automatic Updates (850).

In each case, each of the potentially matching tasks (820 through 850) is user selectable, using conventional point and click-type techniques, and includes a short description of what each task will do if selected.

Figure 9:
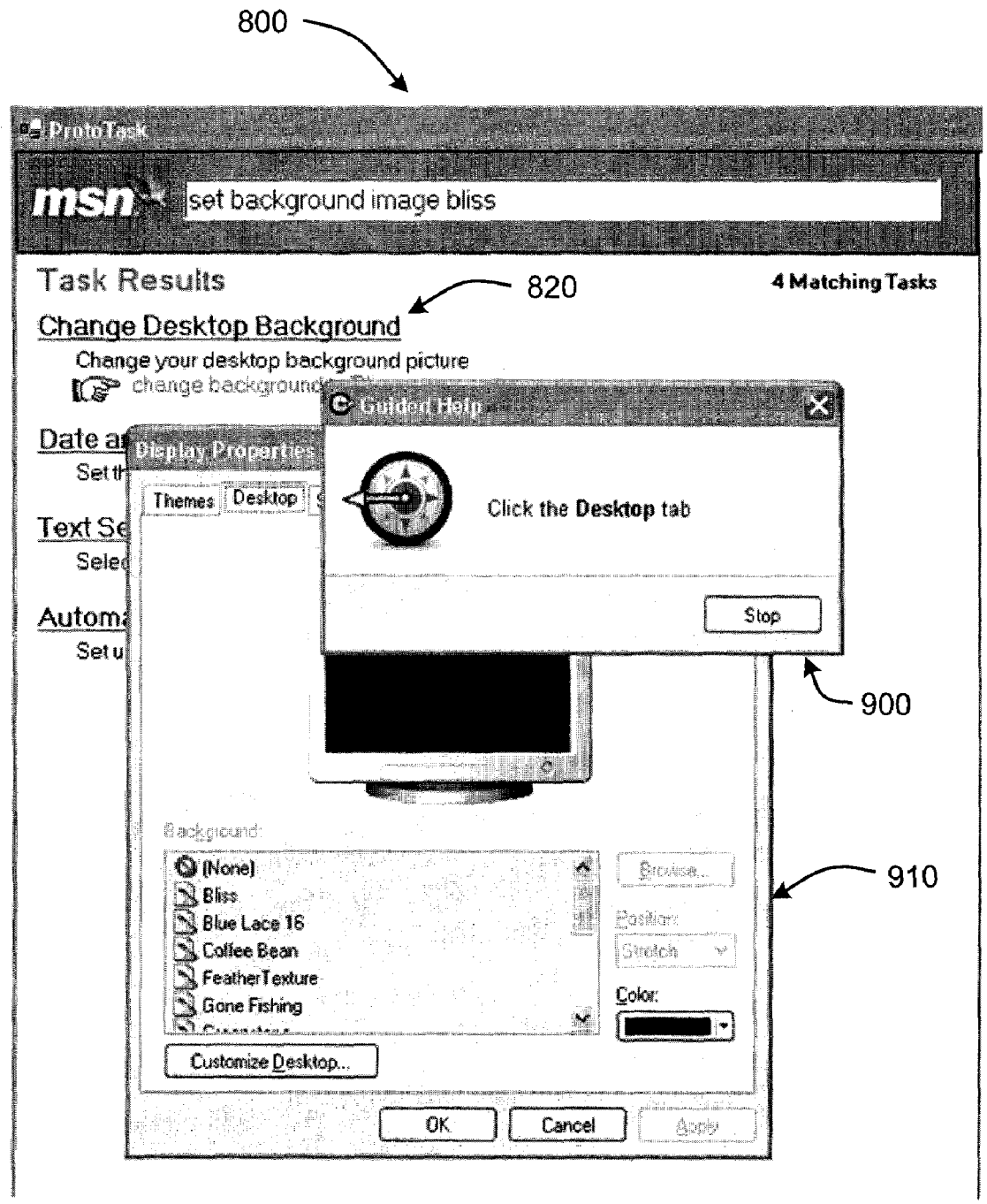
FIG. 9 is an image of an Active Content Wizard (ACW) displayed by the Natural Language Script Interface in response to user selection of one of the selected by the user from the user selectable list of probable tasks of FIG. 8.

As illustrated by FIG. 9, following user selection of the first task 820, an Active Content Wizard (ACW) type script is activated to guide the user through changing the desktop background image to the standard "Bliss" image. It should be noted that in an alternate embodiment, selection of the first task 820 automatically initiates changing of the desktop background image to the standard "Bliss" image without further user interaction. However, in the present example, the selected ACW is designed to guide the user through the image change process in a manner that provides a learning experience for the user.

In particular, as illustrated by FIG. 9, once the user has selected the first task 820, the ACW provides a "Guided Help" window 900 which informs the user of the next step to be taken in order to change the desktop background image. In this case, the ACW also brought up a "Display Properties" window 910. The "Guided Help" window 900 instructs the user to "click" the "Desktop" tab of the "Display Properties" window 910, and provides an icon which points to that tab for easy identification.

Figure 10:
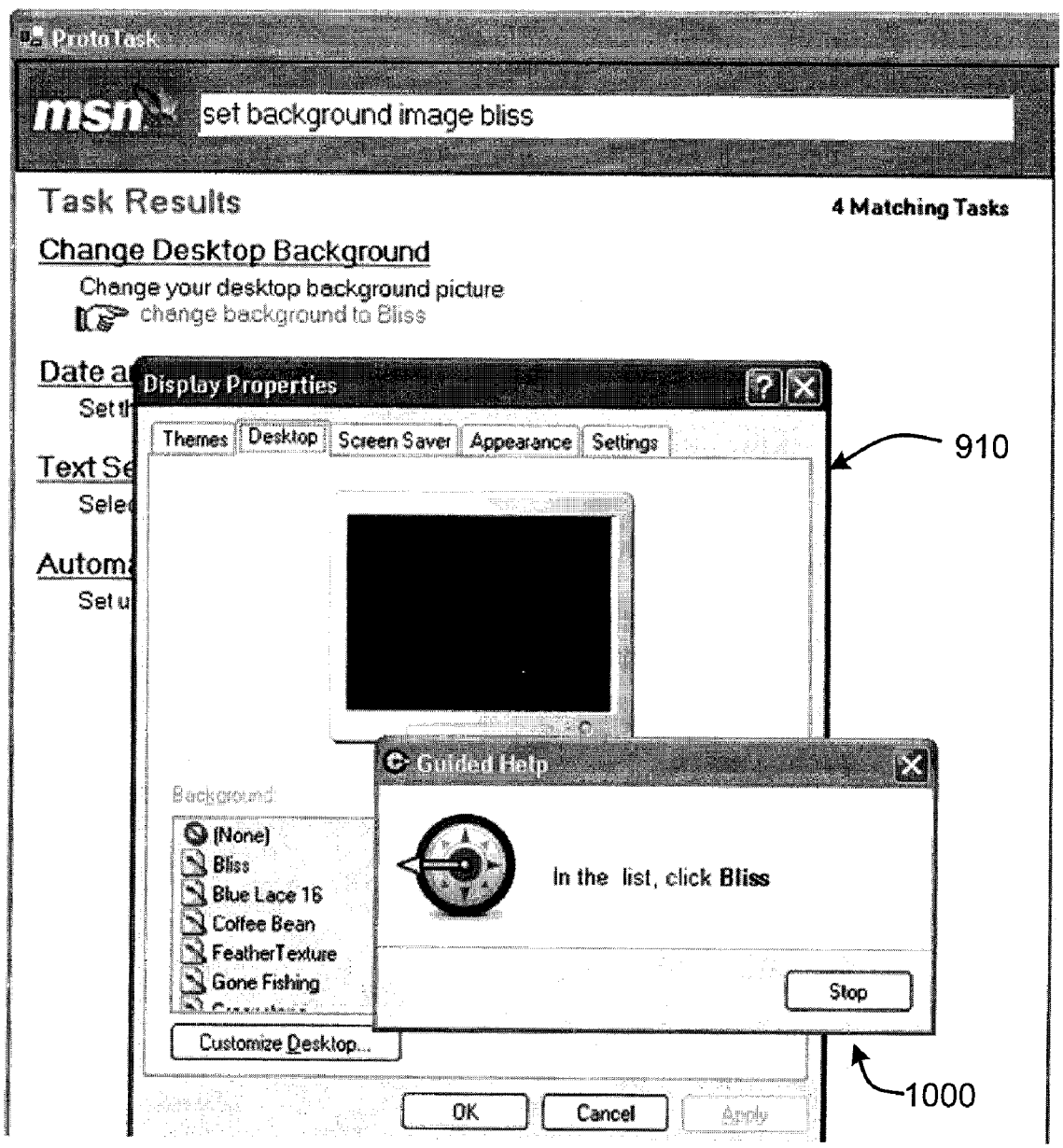
FIG. 10 is an image of the ACW of FIG. 9 following user interaction with the ACW as directed via a "Guided Help" window of the ACW.

As illustrated by FIG. 10, once the user has selected the "Desktop" tab by clicking on that tab, a new "Guided Help" window 1000 is presented to the user. This new "Guided Help" window 1000 instructs the user to click on "Bliss" in the list of background images shown in the "Display Properties" window 910. Again, an icon within the "Guided Help" window 1000 points to the correct place within the window 910 for easy identification.

Figure 11:
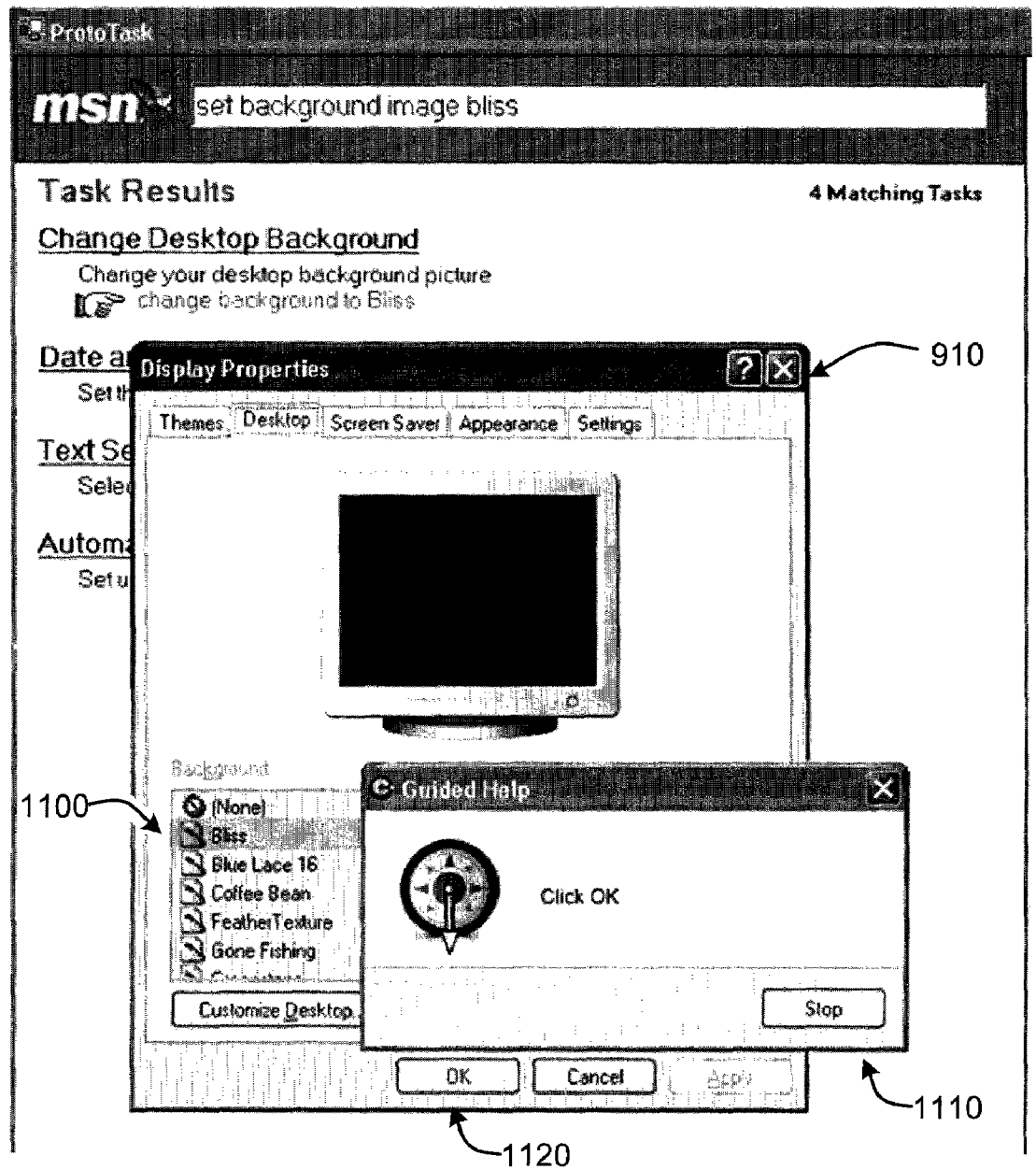
FIG. 11 is an image of the ACW of FIG. 10 following user interaction with the ACW as directed via the "Guided Help" window of the ACW.

Finally, as illustrated by FIG. 11, once the user has selected the "Bliss" image 1100 from the list in the "Display Properties" window 910, the ACW provides a new "Guided Help" window 111 0 which instructs the user to click on the "OK" button 1120 in the "Display Properties" window 910. Once the user clicks the "OK" button 1120, the background image will be automatically changed to the "Bliss" image, and the "Guided Help" window of the ACW will be closed along with the "Display" Properties. The user will then be left with the original user interface window 800 illustrated in FIG. 8 for entry of a new query, or for selection of one of the other listed tasks (820 through 850).

The foregoing description of the NLSI has been presented for the purposes of illustration and description. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Clearly, many modifications and variations are possible in light of the above teaching. Finally, it should be noted that any or all of the aforementioned embodiments may be used in any combination desired to form additional hybrid embodiments of the NLSI described herein.

What is claimed is:

1. A method for identifying actions by semantic analysis of a natural language input, comprising:
    receiving a natural language input from a user;
    performing a semantic analysis of the natural language input to identify probable matches to a plurality of scripts as a function of an initial semantic mapping associated with each script;
    probabilistically scoring using a computer processor and sorting the identified scripts to construct a rank ordered list of probable scripts; and
    presenting the rank ordered list of probable scripts to the user via a user interface.

2. The method of claim 1 wherein performing the semantic analysis of the natural language input comprises:
    deconstructing the natural language input to create a set of one or more tokens from the natural language input; and
    probabilistically evaluating the tokens with respect to the initial semantic mapping associated with each script.

3. The method of claim 1 further comprising:
    receiving context information associated with the natural language input; and
    wherein the semantic analysis is performed with respect to the received context information.

4. The method of claim 1 wherein the scripts within the rank ordered list of probable scripts are user selectable via the user interface.

5. The method of claim 4 wherein user selection of any of the scripts initiates execution of the user selected scripts.

6. The method of claim 4 wherein the user interface provides means for allowing user entry of additional data into Slots within user selected scripts for providing the scripts with information required for successful execution of the selected script.

7. The method of claim 1 wherein one or more of the rank ordered list of probable scripts are automatically executed.

8. The method of claim 1 further comprising extracting information from the natural language input as a part of the semantic analysis for populating applicable Slots within one or more of the scripts for providing those scripts with information required for successful execution of those scripts.

9. The method of claim 1 further comprising machine learning means for learning updated semantic analysis models for performing improved semantic analysis of future natural language inputs as a function of user interaction with the rank ordered list of probable scripts via the user interface.

10. A system for providing a list of probable tasks to a user in response to a user input, comprising using one or more computing devices to perform steps for:
    constructing a set of initial natural language mapping criteria from a set of available tasks;
    receiving a natural language input from a user;
    performing a semantic analysis of the natural language input relative to the initial natural language mapping criteria to identify a set of a plurality of highest probability tasks;
    extracting one or more values from the natural language input for use in populating one or more Slots of one or more of the set of highest probability tasks;
    scoring using a computer processor the tasks comprising the set of highest probability tasks as a function of the semantic analysis and the population of the one or more Slots of those tasks;
    sorting the scored tasks in order of highest to lowest scores to create a rank ordered list of probable tasks; and
    presenting the rank ordered list of probable tasks to the user.

11. The system of claim 10 further comprising steps for receiving context information associated with the natural language input and including an evaluation of the context information in the semantic analysis of the natural language input.

12. The system of claim 10 wherein the scripts within the rank ordered list of probable tasks are user selectable via a user interface.

13. The system of claim 12 wherein user selection of any of the tasks initiates execution of the user selected tasks.

14. The system of claim 12 further comprising steps for user entry of additional data via the user interface into one or more Slots within one or more user selected tasks.

15. The system of claim 12 further comprising steps for:
    observing user interactions with the rank ordered list of probable tasks via the user interface; and
    using the observed user interactions for learning an updated semantic analysis model for use in performing the semantic analysis with respect to further natural language inputs.

16. The system of claim 10 wherein one or more of the rank ordered list of probable tasks are automatically executed.

17. A computer-readable storage medium having computer-executable instructions for presenting user selectable tasks to a user via a user interface, said computer executable instructions comprising means for:
- receiving a natural language input from a user;
- analyzing the natural language input relative to an initial mapping criteria extracted from one or more sets of available tasks to identify a set of a plurality of tasks having a highest probability of match to the natural language input;
- populating one or more variables of a plurality of the highest probability tasks with one or more data elements extracted from the natural language input;
- computing a score for each of the highest probability tasks as a function of a probability of match and the populated variables associated with each of those tasks;
- sorting the highest probability tasks as a function of the score associated with each of those tasks; and
- presenting the sorted tasks to the user via a graphical user interface.

18. The computer-readable storage medium of claim 17 further comprising computer-executable instructions for:
- observing user interactions with the sorted tasks via the user interface; and
- using the observed user interactions for learning an updated semantic analysis model for use in analyzing further natural language inputs.

19. The computer-readable storage medium of claim 17 further comprising computer-executable instructions for initiating execution of the tasks selected via the user interface.

20. The computer-readable storage medium of claim 17 further comprising computer-executable instructions for facilitating user entry of data elements via the user interface for populating one or more variables of one or more of the sorted tasks.

* * * * *